US007115859B2

(12) United States Patent
Cornish

(10) Patent No.: US 7,115,859 B2
(45) Date of Patent: *Oct. 3, 2006

(54) TIME- OF FLIGHT MASS SPECTROMETERS FOR IMPROVING RESOLUTION AND MASS EMPLOYING AN IMPULSE EXTRACTION ION SOURCE

(75) Inventor: Timothy J. Cornish, Catonsville, MD (US)

(73) Assignee: The Johns Hopkins University, Baltimore, MD (US)

( * ) Notice: Subject to any disclaimer, the term of this patent is extended or adjusted under 35 U.S.C. 154(b) by 154 days.

This patent is subject to a terminal disclaimer.

(21) Appl. No.: 10/486,473

(22) PCT Filed: Jul. 17, 2003

(86) PCT No.: PCT/US03/22438

§ 371 (c)(1),
(2), (4) Date: Feb. 10, 2004

(87) PCT Pub. No.: WO2004/008470

PCT Pub. Date: Jan. 22, 2004

(65) Prior Publication Data

US 2004/0195501 A1 Oct. 7, 2004

Related U.S. Application Data

(60) Provisional application No. 60/396,896, filed on Jul. 17, 2002.

(51) Int. Cl.
*B01D 55/44* (2006.01)
*H01D 49/00* (2006.01)

(52) U.S. Cl. ....................... 250/287; 250/283; 250/397

(58) Field of Classification Search ................ 250/282, 250/287, 397
See application file for complete search history.

(56) References Cited

U.S. PATENT DOCUMENTS

| | | | | |
|---|---|---|---|---|
| 2,685,035 | A | 7/1954 | Wiley | |
| 5,504,326 | A | 4/1996 | Reilly et al. | |
| 5,510,613 | A | 4/1996 | Reilly et al. | |
| 5,625,184 | A * | 4/1997 | Vestal et al. | 250/287 |
| 5,641,959 | A | 6/1997 | Holle et al. | |
| 5,654,545 | A | 8/1997 | Holle et al. | |
| 5,661,298 | A | 8/1997 | Bateman | |
| 5,734,161 | A | 3/1998 | Köster | |
| 5,753,909 | A | 5/1998 | Park et al. | |
| 5,777,325 | A | 7/1998 | Weinberger et al. | |
| 5,861,623 | A | 1/1999 | Park | |
| 5,905,259 | A | 5/1999 | Franzen | |

(Continued)

OTHER PUBLICATIONS

International Search Report PCT/US03/22438 Mailed May 7, 2004.

*Primary Examiner*—John R. Lee
*Assistant Examiner*—David A. Vanore
(74) *Attorney, Agent, or Firm*—Albert J. Fasulo, II

(57) ABSTRACT

A miniature time-of-flight mass spectrometer (TOF-MS) and method for increasing the collection efficiency of laser-desorbed ions in a miniature time-of-flight mass spectrometer (TOF-MS) is provided. The method provides a laser pulse generated by an ionization extraction device within the TOF-MS; maintains a sample plate potential at a ground level for a fixed delay period of about 50 ns; and uses a high voltage switch to sharply increase the sample plate potential up to 10 kV/mm.

8 Claims, 7 Drawing Sheets

U.S. PATENT DOCUMENTS 6,040,575 A 3/2000 Whitehouse et al.
6,518,568 B1 2/2003 Kovtoun et al.
6,614,020 B1 * 9/2003 Cornish ...................... 250/287
2002/0145110 A1 10/2002 Holle
2002/0155483 A1 10/2002 Holle et al.
2003/0001089 A1 1/2003 Reilly et al.
2003/0020010 A1 1/2003 Cornish et al.
2003/0025074 A1 2/2003 Li

* cited by examiner

TIME- OF FLIGHT MASS SPECTROMETERS FOR IMPROVING RESOLUTION AND MASS EMPLOYING AN IMPULSE EXTRACTION ION SOURCE

CROSS-REFERENCE TO RELATED APPLICATIONS

This application claims the benefit of prior filed U.S. Provisional Patent Application No. 60/396,896, filed Jul. 17, 2002 now abandoned, the contents of which are incorporated by reference herein.

BACKGROUND OF THE INVENTION

1. Field of the Invention

The present invention generally relates to miniature time-of-flight mass spectrometers (TOF-MS) for improving resolution and mass range employing an impulse extraction ion source and methods for its use.

2. Description of the Related Art

Miniature time-of-flight mass spectrometers (TOF-MS) have the potential to be used in numerous field-portable and remote sampling applications due to their inherent simplicity and potential for ruggedization. However, these miniature time-of-flight mass spectrometers traditionally suffer from low mass resolution due to the reduced drift length of the analyzer. Attempts have been made to recover this reduction in mass resolution, by using, for example, ion reflectors. Typically, though, ion reflectors exhibit a limited useful mass range, typically less than 5 kDa. While this range is useful for many biological agents, a much wider mass range is required to detect intact proteins and numerous biological warfare agents. To this end, several forms of "pulsed extraction (PE)" or "delayed extraction" techniques have been developed to reduce the peak widths of ions detected in the TOF analyzer. These methods, however, improve the resolution for only a fraction of the total mass spectrum for any given delay setting thereby requiring the TOF analyzer to be scanned in order to achieve good resolution across a broad mass range.

A need therefore exists for an apparatus and method that does not require the TOF analyzer to be scanned in order to achieve good resolution across a broad mass range.

SUMMARY OF THE INVENTION

In accordance with the present invention, a device for increasing the mass resolution of laser-desorbed MALDI ions across a wide mass range is provided, the device comprising:

an ionization extraction device having an unobstructed central chamber for guiding ions there through;

a microchannel plate detector assembly having channel extending through at least a portion of the assembly;

a flexible circuit-board reflector, wherein said channel is aligned with a central axis of said ionization extraction device and a central axis of said reflector; and a voltage switch for increasing a sample plate potential sharply.

Further in accordance with the present invention is a method for increasing the mass resolution of laser-desorbed ions across a wide mass range in a miniature time-of-flight mass spectrometer (TOF-MS), said ions being desorbed through matrix assisted laser desorption/ionization (MALDI), said method comprising the steps of:

providing a laser pulse for ion creation in a source region;

maintaining a sample plate potential at a ground level for a delay period; and increasing said sample plate potential sharply after the delay period.

BRIEF DESCRIPTION OF THE DRAWINGS

The above and other objects, features and advantages of the present invention will become more apparent from the following detailed description when taken in conjunction with the accompanying drawings in which.

DESCRIPTION OF THE PREFERRED EMBODIMENTS

The present invention is a new type of delayed extraction ion source with at least two novel features distinguishing it from traditional PE techniques. The source region employed is significantly shorter than conventional pulsed extraction sources and the delay time before application of the extraction pulse is significantly reduced. The result is a significant reduction in peak width for high mass ions compared to the continuous extraction mode in a linear time-of-flight instrument. Although the ion peak widths are found to be somewhat broader than those acquired using traditional PE methods, the new impulse technique is found to be effective over a very wide mass range requiring no scanning of the instrument's voltage or time delay settings.

One example of the gridless, focusing ion source that can be used for the inventive technique has been described in a prior filed co-pending U.S. patent application Ser. No. 10/220,865, filed Sep. 6, 2002, the contents of which are included herein by reference. The miniature time-of-flight mass spectrometer (TOF-MS) of the gridless, focusing ion source of the above referenced application include:

A. The gridless, focusing ionization extraction device,

B. The flexible, circuit-board reflector, and

C. The center-hole microchannel plate detector assembly.

Each of these features of the copending application will be described below for a better understanding of the present invention.

A. Gridless, Focusing Ionization Extraction Device

Figure 1A:
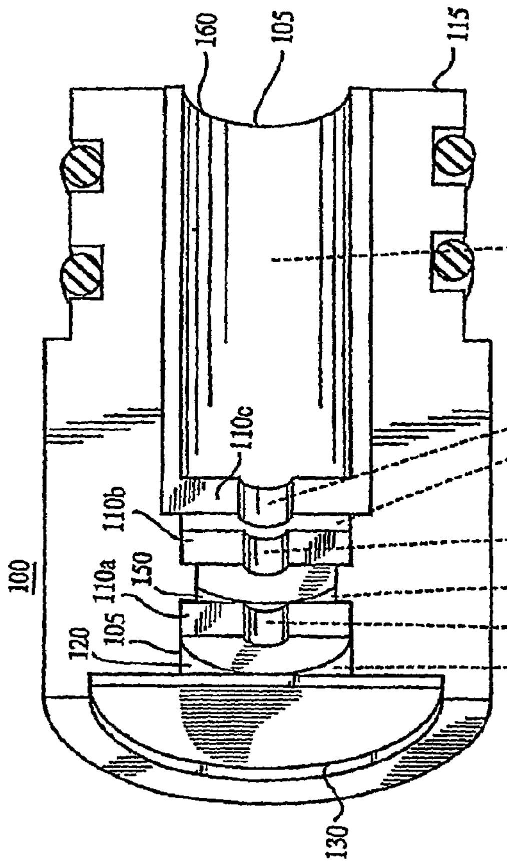
FIG. 1A is a cross-sectional view of an example gridless, focusing ionization extraction device for a TOF-MS according to the present invention.

The gridless, focusing ionization extraction device increases the collection efficiency of laser-desorbed ions from a surface. The ionization extraction device is shown by FIG. 1A and designated generally by reference numeral 100. The device 100 has a preferred length of approximately 17–25 mm and includes a series of closely spaced micro-cylinders 110*a–c* mounted within an unobstructed central chamber 105 which is defined by the housing 115. The housing is constructed from one or more insulating materials, such as ceramics, Teflon, and plastics, preferably, PEEK plastic.

The micro-cylinders 110*a–c* are constructed from metallic materials, such as stainless steel and may have varying thickness ranges. Further, it is contemplated that each micro-cylinder is constructed from a different metal and that each micro-cylinder has a different thickness. The micro-cylinders 110 create an extremely high ion acceleration/extraction field (up to 10 kV/mm) in region 120, as shown by the potential energy plot depicted by FIG. 1B, between a flat sample probe 130 and an extraction micro-cylinder 110*a*.

Ions are created in region 120 by laser ablation or matrix assisted laser desorption/ionization (MALDI). The ions are then accelerated by the ion acceleration/extraction field in region 120.

The ions are slowed in a retarding field region 150 between the extraction micro-cylinder 110*a* and the middle micro-cylinder 110*b*. The retarding field region 150 serves both to collimate the ion beam, as well as to reduce the ion velocity. The ions are then directed through the middle micro-cylinder 110*b*, where the ions are accelerated again (up to 3 kV/mm as shown by FIG. 1B).

Figure 1B:
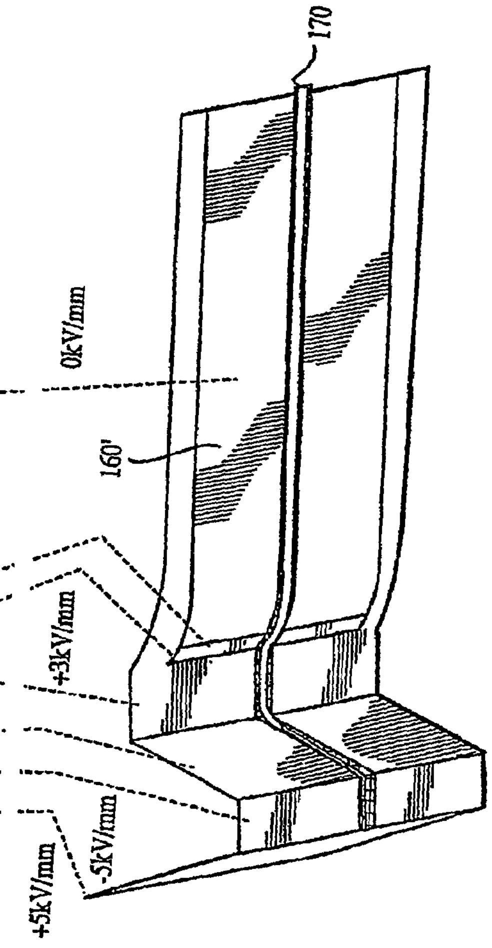
FIG. 1B is a potential energy plot of the electric field generated by the gridless, focusing ionization extraction device.

After traversing through the micro-cylinders 110*a–c*, the ions enter a drift region 160 within the chamber 105 where the potential energy is approximately 0 kV/mm as shown by the potential energy plot depicted by FIG. 1B and referenced by numeral 160'. Reference number 170 in FIG. 1B references the ion trajectories through the device 100.

The series of micro-cylinders 110*a–c* minimizes losses caused by radial dispersion of ions generated during the desorption process. Although the ionization extraction device 100 of the present invention employs a very high extraction field 120, the ions are slowed prior to entering the drift region 160, thus resulting in longer drift times (or flight duration) and hence increased ion dispersion of the ions within the drift region 160.

Furthermore, the performance of the ionization extraction device 100 is achieved without the use of any obstructing elements in the path of the ions, such as grids, especially before the extraction micro-cylinder 110*a*, as in the prior art, thus eliminating transmission losses, signal losses due to field inhomogeneities caused by the grid wires, as well as the need for periodic grid maintenance.

B. Flexible, Circuit-Board Reflector

Ion reflectors, since their development 30 years ago, have become a standard part in many TOF-MSs. While there have been improvements in reflector performance by modifications to the voltage gradients, the mechanical fabrication is still based on stacked rings in most laboratory instruments. In such a design, metallic rings are stacked along ceramic rods with insulating spacers separating each ring from the next. While this has been proven to be satisfactory for the construction of large reflectors, new applications of remote TOF mass analyzers require miniaturized components, highly ruggedized construction, lightweight materials, and the potential for mass production.

Figure 2A:
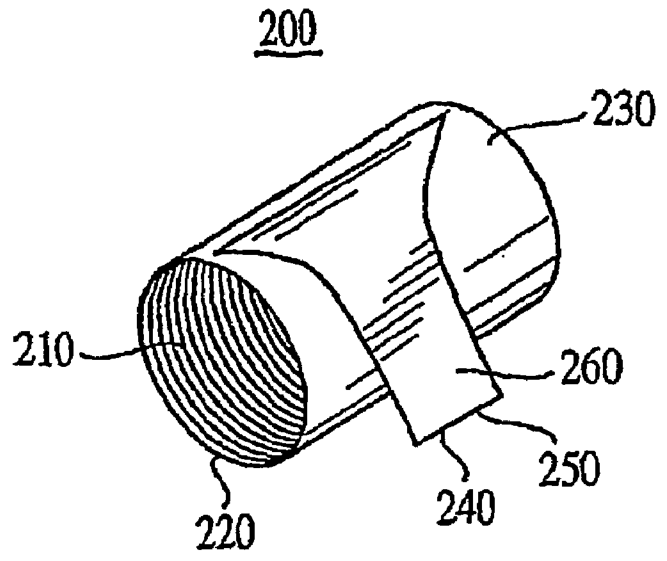
FIG. 2A is a perspective view of an example flexible circuit-board reflector in a rolled form according to the present invention.
Figure 2B:
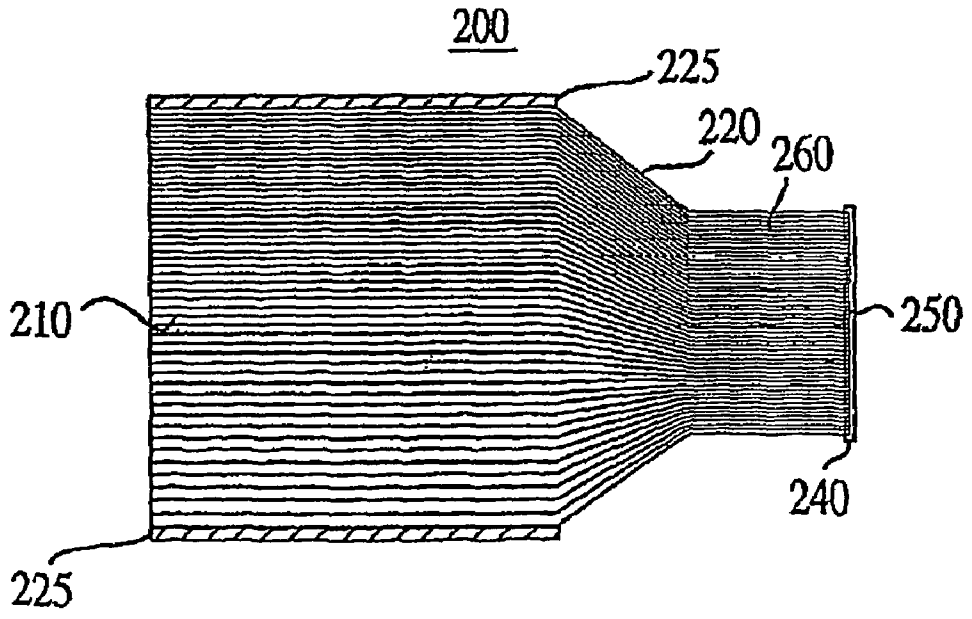
FIG. 2B is top view of the flexible circuit-board reflector in an unrolled form.

To this end, the ion reflector of the present invention shown by FIGS. 2A and 2B and designated generally by reference numeral 200 was developed utilizing the precision of printed circuit-board technology and the physical versatility of thin, flexible substrates. A series of thin copper traces (e.g., 0.203 mm wide by 0.025 mm thick) 210 are etched onto a flat, flexible circuit-board substrate 220 having tabs 225 protruding from two opposite ends (FIG. 2B). The circuit-board substrate 220 is then rolled into a tube 230 (FIG. 2A) to form the reflector body, with the copper traces 210 facing inward, forming the isolated rings that define the voltage gradient.

The thickness and spacing of the copper traces 210 can be modified by simply changing the conductor pattern on the substrate sheet 220 during the etching process. This feature is particularly useful for the production of precisely tuned non-linear voltage gradients, which are essential to parabolic or curved-field reflectors. The trace pattern on the circuit-board substrate 220 shown in FIGS. 2A and 2B represents a precision gradient in the spacing of the traces 210. Thus, in the resultant reflector, a curved potential gradient is generated by employing resistors of equal value for the voltage divider network.

In an embodiment, the reflector is constructed from a circuit-board with equally-spaced copper traces 210 used in conjunction with a series of potentiometers to establish a curved potential gradient.

Once etched, the circuit-board substrate 220 is rolled around a mandrel (not shown) to form a tubular shape as shown in FIG. 2A. Five layers of fiberglass sheets, each approximately 0.25 mm thick, are then wrapped around the circuit-board substrate 220. The length of the curving edge of the board 220 is approximately equal to the circumference of the mandrel. When the sheets are wrapped around the rolled circuit-board, a slight opening remains through which a connector end 240 of the inner circuit-board can extend. The position of each successive sheet is offset slightly with respect to the previous sheet so that a gradual "ramp" is formed, thereby guiding the flexible circuit-board substrate 220 away from the mandrel.

The reflector assembly is heated under pressure at 150.degree. C. for approximately two hours, followed by removal of the mandrel. Wall thickness of the finished rolled reflector assembly is approximately 1.5 mm. A multi-pin (preferably, 50-pin) ribbon-cable connector 250 is soldered onto a protruding circuit-board tab 260 so that a voltage divider resistor network can be attached to the reflector. Alternately, soldering pads for surface-mount resistors can be designed into the circuit-board layout, allowing the incorporation of the voltage divider network directly onto the reflector assembly.

Finally, polycarbonate end cap plugs (not shown) are fitted into the ends of the rolled reflector tube 230 to support the assembly as well as provide a surface for affixing terminal grids. Vacuum tests indicate that the circuit-board and fiberglass assembly is capable of achieving vacuum levels in the low 10.sup.-7 torr range.

The reflector 200 is disclosed in a U.S. Provisional Patent Application Ser. No. 60/149,103, filed on Aug. 16, 1999, and incorporated herein its entirety by reference.

C. Center-Hole Microchannel Plate Detector Assembly

For miniature TOF mass spectrometers, the center hole (coaxial) geometry is a highly desirable configuration because it enables the simplification of the overall design and allows for the most compact analyzer. However, the poor signal output characteristics of conventional center hole microchannel plate detector assemblies, particularly the problem with signal "ringing", clutter the baseline and, as a consequence, adversely affects the dynamic range of the instrument. This limitation severely reduces the chance of realizing high performance in miniature TOF instruments, since low intensity fragment or product ion peaks can be obscured by baseline noise. Improvements to the analog signal quality of center-hole channel-plate detectors would therefore increase the ultimate performance of the mass spectrometer, particularly the dynamic range.

Commercially available coaxial channel-plate detectors rely upon a disk-shaped center-hole anode to collect the pulse of electrons generated by the microchannel plates. The anode is normally matched to the diameter of the channel-plates, thereby, in theory, maximizing the electron collection efficiency. However, the center-hole anode creates an extraneous capacitance within the grounded mounting enclosure. The center-hole anode also produces a significant impedance mismatch when connected to a 50 .OMEGA. signal cable. The resultant ringing degrades and complicates the time-of-flight spectrum by adding a high frequency component to the baseline signal. Moreover, the disk-shaped anode acts as an antenna for collecting stray high frequencies from the surrounding environment, such as those generated by turbo-molecular pump controllers.

Figure 3A:
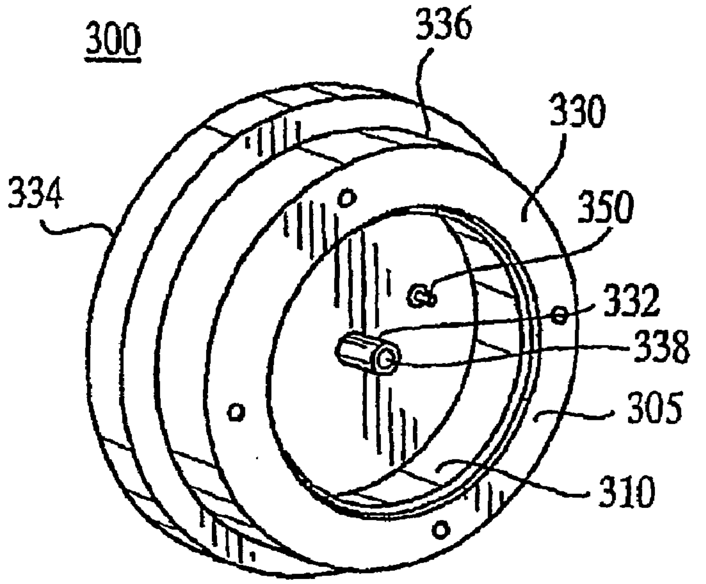
FIG. 3A is a perspective view of an example center-hole microchannel plate detector assembly according to the present invention.
Figure 3B:
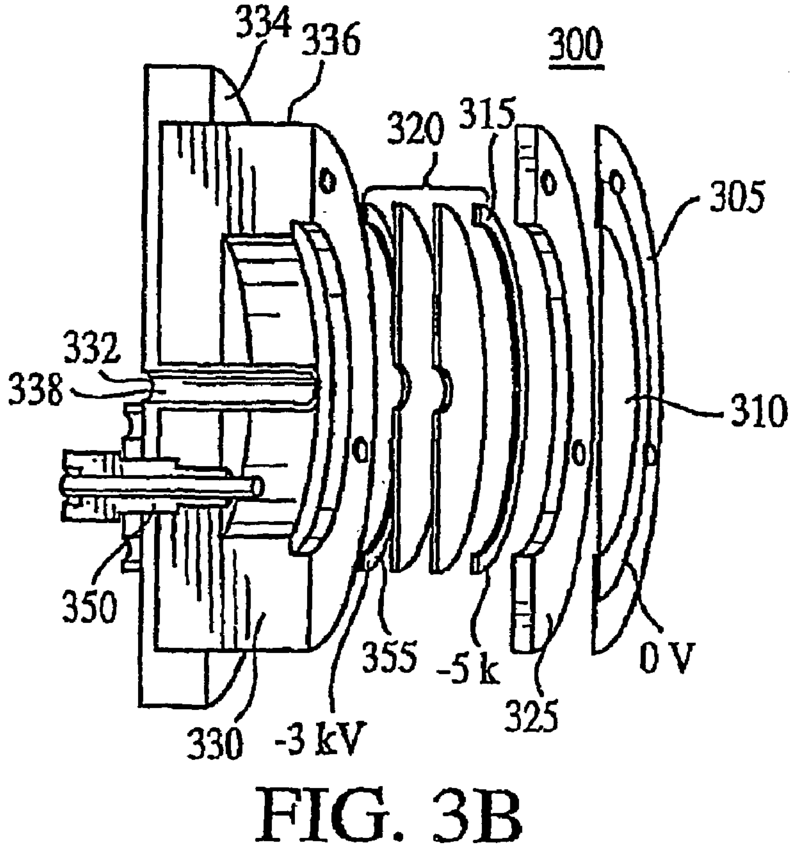
FIG. 3B is a cross-sectional, exploded view of the center-hole microchannel plate detector assembly showing the internal components.

The pin anode design of the center-hole microchannel plate detector assembly of the present invention as shown by FIGS. 3A and 3B and designated generally by reference numeral 300 has been found to substantially improve the overall performance of the detector assembly 300. For enhanced sensitivity, the assembly 300 includes a clamping ring 305 having an entrance grid 310 which is held at ground potential while a front surface 315 of a center-hole microchannel plate assembly 320 (FIG. 3B) is set to −5 kV, post-accelerating ions to 5 keV. The clamping ring 305 is bolted to an inner ring 325. The inner ring 325 is bolted to a spherical drum 330 having a tube 332 extending from a center thereof and a shield 334 encircling an outer surface 336. The tube 332 defines a channel 338. The shield is fabricated from any type of conducting material, such as aluminum, and stainless steel foil.

Using voltage divider resistors, the rear of the plate assembly 320 is held at 3 kV as shown by FIG. 3B. Since the collection pin anode 350 is isolated from the center of the detector assembly 300, i.e., isolated from the channel 338 defined by the tube 332, its potential is defined by an associated detector amplifier (nominally ground). Thus, electrons emitted from a rear microchannel plate 355 of the plate assembly 320 will be accelerated toward the grounded anode 350 regardless of the anode's size, geometry, or location. The pin anode 350 is located about 5 mm behind the rear microchannel plate 355.

It has been demonstrated that the pin anode 350 significantly improves the overall performance of the detector assembly 300. The inventive center-hole microchannel plate detector assembly 300 virtually eliminates the impedance mismatch between the 50 ohm signal cable and the electron collection surface, i.e., the pin anode 350.

Figure 4A:
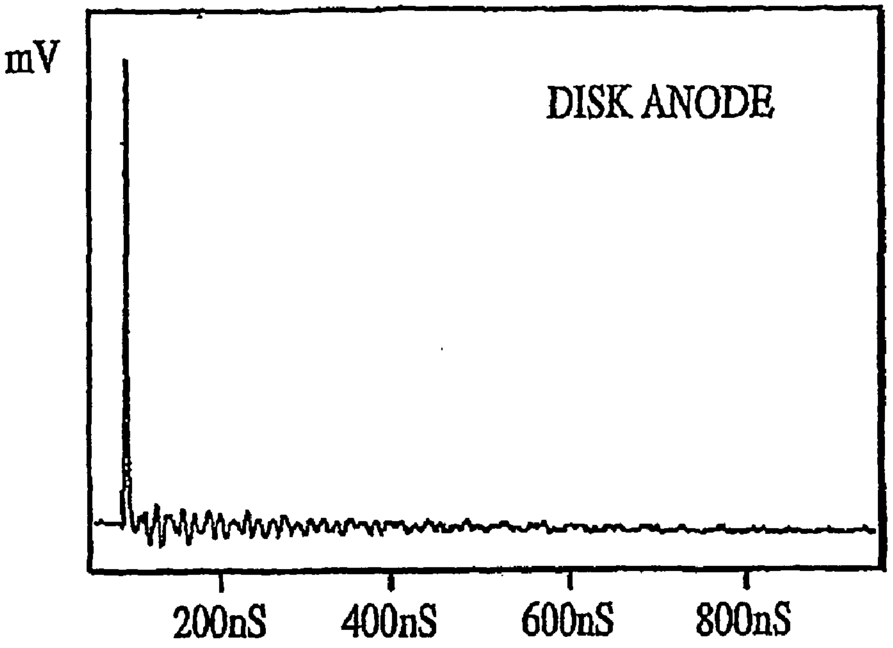
FIGS. 4A and 4B illustrate the detector response waveform for both the single ion signal from a conventional disk anode detector assembly and the center-hole microchannel plate detector assembly having a pin anode, respectively.
Figure 4B:
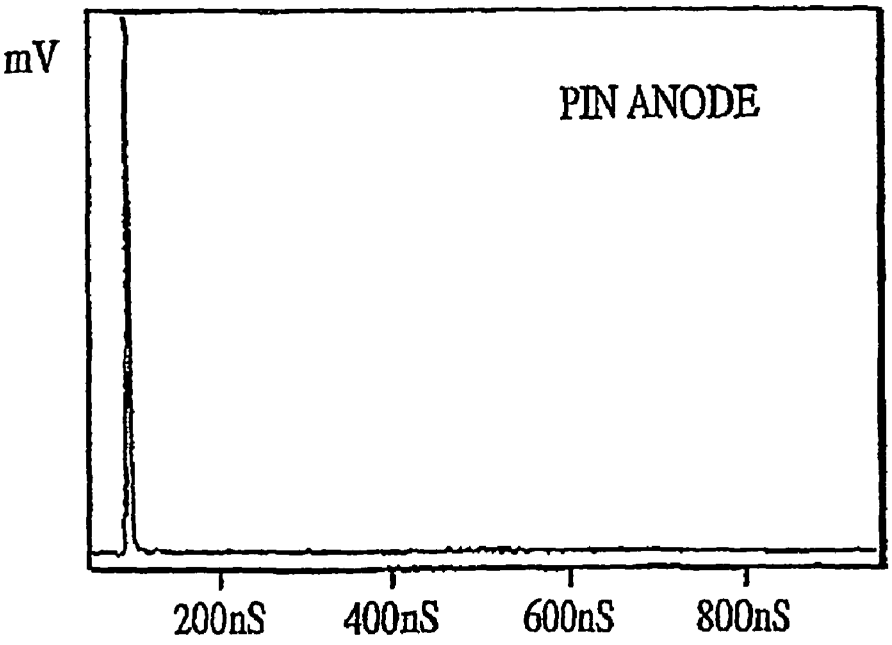

FIGS. 4A and 4B compare the single ion detector response for both the conventional disk anode and the pin anode configurations. It is evident from FIGS. 4A and 4B that ringing is significantly reduced and the ion pulse width is reduced to a value of 500 ps/pulse, limited by the analog bandwidth of the oscilloscope used for the measurement (1.5 GHz: 8 Gsamples/sec), when using the pin anode configuration of the present invention. Furthermore, the background signal in the time-of-flight data caused by spurious noise is found to be much quieter when the pin anode configuration is used.

Figure 5:
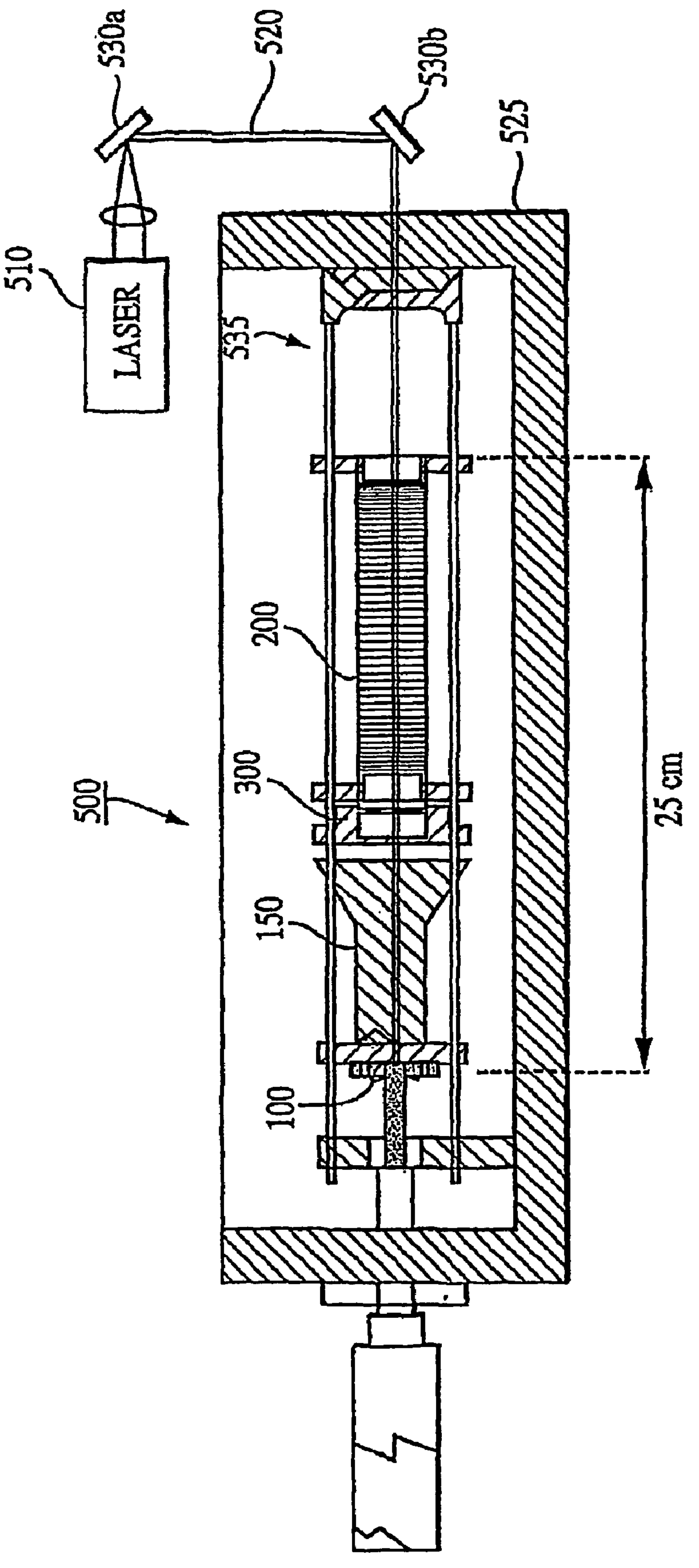
FIG. 5 is a cut-away view of the TOF-MS having the gridless, focusing ionization extraction device, the flexible circuit-board reflector and the center-hole microchannel plate detector assembly according to the present invention.

FIG. 5 depicts a TOF-MS designated generally by reference numeral 500 containing the focusing ionization extraction device 100, the flexible circuit-board reflector 200, and the microchannel plate detector assembly 300. The overall length of the entire TOF-MS is approximately 25 cm. A laser 510, such as a nitrogen laser, is used for acquiring MALDI and laser ablation spectra. The laser 510 emits a laser beam 520 which is directed through the TOF-MS 500 using two mirrors 530*a*, 530*b*. The TOF-MS 500 is enclosed within a vacuum chamber 525 and mounted into position by a bracket/rod assembly 535 such that the laser beam 520 passes through a central path defined by the inventive components. In an experimental study, time-of-flight data was acquired on a LeCroy 9384 Digital Oscilloscope (1 GHz: 2 Gsam/s) used in conjunction with spectrum acquisition software.

Figure 6:
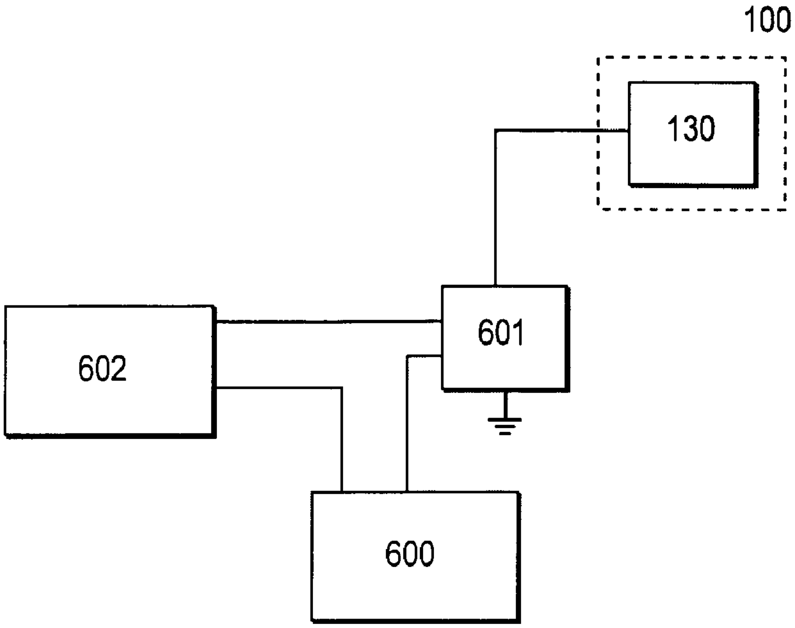
FIG. 6 is a block diagram depicting the mass spectrometer according to an embodiment of the present invention.
Figure 7:
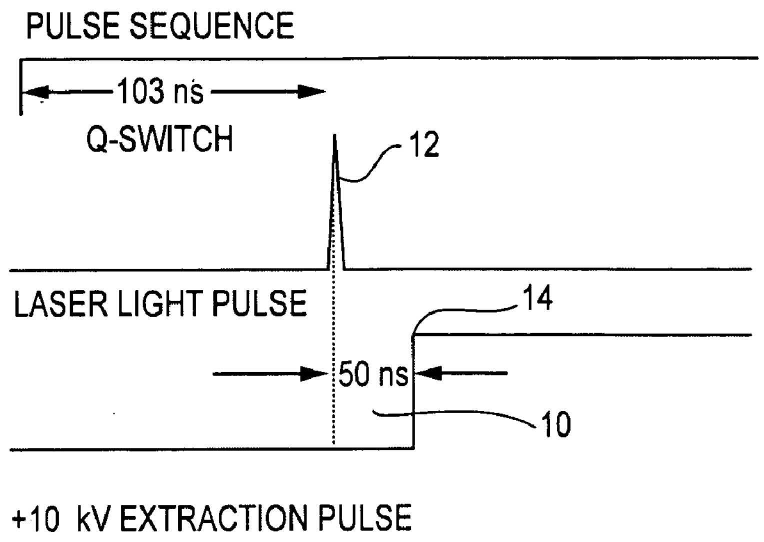
FIG. 7 is a pulse sequence used for the impulse extraction technique.

The gridless, focusing ion source discussed above was used for the application of a constant field, whereas in the present invention, the gridless, focusing ion source is used in a pulsed extraction mode. FIG. 6 is a block diagram depicting the mass spectrometer of the present invention. FIG. 7 shows the pulse sequence used for the impulse extraction technique. The sample plate 130 is held at ground potential (10) for approximately 50 ns following the laser ionization pulse (12). After this fixed delay time, plate 130 is pulsed up to +10 kV (14) using a high voltage delay generator 602. In this case, a high voltage switch 601 (Behlke) is employed to supply the fast rise-time high voltage pulse. The high voltage delay generator 602 and high voltage switch 601 are under control of controller 600.

Figure 8:
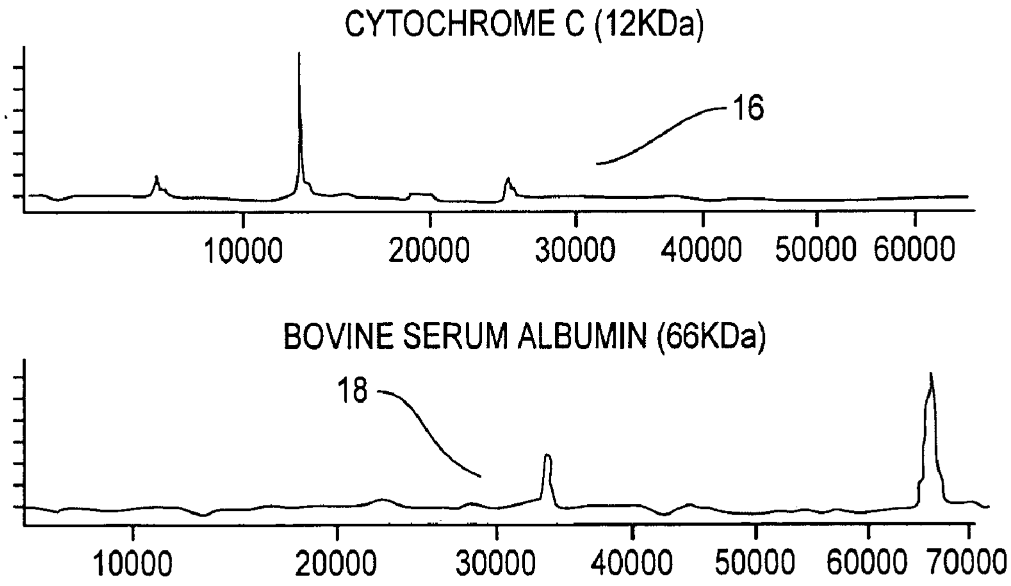
FIG. 8 is an impulse delay spectra for Cytochrome C and Bovine Serum Albunium (BSA) showing several proteins covering a broad mass range.

FIG. 8 illustrates the impulse extraction spectra for Cytochrome C (16) and Bovine Serum Albunium (18). Both spectra (16) and (18), acquired on a 5" linear TOF-MS, show several analytes covering a broad mass range. The pulse delay time, used to generate these data, was 50 ns the same for both analyses. The improved resolution of impulse extraction over constant field extraction is possibly explained by the fact that it appears large ions formed by the matrix assisted laser desorption/ionization (MALDI) process require 10's of nanoseconds to acquire a charge. Allowing the desorbed molecules to drift in a field free region for at least 50 ns enables charge transfer to occur through multiple collisions with the matrix ions, yet they have insufficient time to expand far into the source region, a migration of less than 10 μm.

Resultant peak widths of impulse extraction are therefore significantly sharper since ions of a given m/z are accelerated simultaneously while at the same position in the source region and hence acquire the same velocity. In contrast, under constant field extraction conditions, the ions, as soon as they become charged, are accelerated over an extended period of time. Moreover, this process occurs throughout a range of acceleration potentials due to the field gradient in the source region. The longer the time required for ionization to occur, the broader the resultant TOF peaks will be What has been described herein is merely illustrative of the application of the principles of the present invention. For example, the functions described above and implemented as the best mode for operating the present invention are for illustration purposes only. Other arrangements and methods may be implemented by those skilled in the art without departing from the scope and spirit of this invention.

What is claimed is:

1. A device for increasing the mass resolution of laser-desorbed MALDI ions across a wide mass range, said device comprising:

an ionization extraction device having an unobstructed central chamber for guiding ions therethrough;

a microchannel plate detector assembly having a channel extending through at least a portion of the assembly;

a flexible circuit-board reflector, wherein said channel is aligned with a central axis of said ionization extraction device and a central axis of said reflector; and a voltage switch for increasing a sample plate potential sharply.

2. The device of claim 1, wherein the ionization extraction device includes:

a first region for creating an ion acceleration/extraction field measuring up to 10 kV/mm and for accelerating the ions accelerating ions;

a second region for de-accelerating the ions to collimate the ions and to reduce the velocity of the ions; and a third region for causing the ions to disperse and having an electric field measurement of approximately 0 kV/mm.

3. The device of claim 1, further comprising a laser for providing a laser pulse for ion creation in a source region.

4. The device of claim 3, wherein said voltage switch increases said sample plate potential to create an ion acceleration/extraction field near the sample plate of up to 10 kV/mm after a delay period.

5. The device of claim 4, wherein said delay period is about 50 ns.

6. The device of claim 4, wherein said sample plate potential is increased to create an ion acceleration/extraction field near the sample plate of up to 10 kV/mm.

7. An ionization extraction device for use in a TOF-MS comprising:

a housing defining an unobstructed central chamber for guiding ions therethrough;

a first region within the central chamber for accelerating ions for creating an ion acceleration/extraction field measuring up to 10 kV/mm for accelerating the ions;

a second region within the central chamber in proximity to the first region for de-accelerating the ions entering therein;

a third region within the central chamber for causing the ions to disperse and having an electric field measurement of about 0 kV/mm;

a laser for providing a laser pulse for ion creation in a source region; and a voltage switch for increasing a sample plate potential sharply to create an ion acceleration/extraction field near the sample plate of up to 10 kV/mm after a delay period of about 50 ns.

8. A method for increasing the mass resolution of laser-desorbed ions in a TOF-MS, said method comprising the steps of:

providing an ionization extraction device within the TOF-MS, the ionization extraction device having an unobstructed central chamber having a first region and a second region;

creating an ion acceleration/extraction field measuring up to 10 kV/mm within the first region;

creating ions in the first region by one of laser ablation and matrix assisted laser desorption/ionization (MALDI);

aligning a central axis of the ionization extraction device with a tubular channel of a microchannel plate detector assembly of the TOF-MS;

aligning a central axis of the ionization extraction device with a central axis of a circuit-board reflector of the TOF-MS;

providing a laser pulse for ion creation in a source region;

maintaining a sample plate potential at a ground level for a delay period; and increasing said sample plate potential sharply after the delay period.

* * * * *